(12) United States Patent
Kanaguchi et al.

(10) Patent No.: US 9,308,941 B2
(45) Date of Patent: Apr. 12, 2016

(54) VEHICLE BODY SIDE PORTION STRUCTURE

(71) Applicant: HONDA MOTOR CO., LTD., Minato-Ku, Tokyo (JP)

(72) Inventors: Yutaka Kanaguchi, Utsunomiya (JP); Youichirou Suzuki, Kawachi-Gun (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 14/347,020

(22) PCT Filed: Nov. 9, 2012

(86) PCT No.: PCT/JP2012/079117
§ 371 (c)(1),
(2) Date: Mar. 25, 2014

(87) PCT Pub. No.: WO2013/077200
PCT Pub. Date: May 30, 2013

(65) Prior Publication Data
US 2014/0232138 A1    Aug. 21, 2014

(30) Foreign Application Priority Data
Nov. 25, 2011    (JP) .................................. 2011-257945

(51) Int. Cl.
*B62D 25/04* (2006.01)
*B62D 29/00* (2006.01)
(Continued)

(52) U.S. Cl.
CPC .............. *B62D 25/04* (2013.01); *B62D 21/157* (2013.01); *B62D 25/2036* (2013.01); *B62D 27/023* (2013.01); *B62D 29/005* (2013.01); *B62D 65/02* (2013.01)

(58) Field of Classification Search
CPC .. B62D 25/04; B62D 27/023; B62D 25/2036; B62D 29/005; B62D 65/02; B62D 21/157
USPC .................. 296/187.12, 193.06, 203.03, 204, 296/187.03
See application file for complete search history.

(56) References Cited

U.S. PATENT DOCUMENTS 5,094,504 A    3/1992    Wurl
5,398,989 A    3/1995    Winter et al.
(Continued)

FOREIGN PATENT DOCUMENTS

CN          1958347 A           5/2007
DE     102005038488 A1          2/2007
(Continued)

OTHER PUBLICATIONS

International Search Report issued in PCT/JP2012/079117 with a mailing date of Feb. 12, 2013.
(Continued)

*Primary Examiner* — Joseph D Pape
*Assistant Examiner* — Dana Ivey
(74) *Attorney, Agent, or Firm* — Carrier Blackman & Associates, P.C.; William D. Blackman; Joseph P. Carrier

(57) ABSTRACT

In a vehicle body side portion structure, a center pillar includes an upper pillar section joined to a roof side rail and a lower pillar section joined to a side sill, the upper pillar section including a metallic pipe having a high-strength steel plate, has a substantially constant cross-sectional shape, and is convexly curved outwardly in a vehicle width direction, the lower pillar section is formed by two pressed components including a steel plate having lower strength than the steel plate of the hollow metallic pipe of the upper pillar section and are joined to each other into a closed cross-sectional shape, and the upper pillar section is joined to the two pressed components such that the lower edge part of the upper pillar section is inserted within a section configured by the two pressed components of the lower pillar section and having the closed cross-sectional shape.

19 Claims, 14 Drawing Sheets

(51) Int. Cl.
  *B62D 65/02* (2006.01)
  *B62D 27/02* (2006.01)
  *B62D 21/15* (2006.01)
  *B62D 25/20* (2006.01)

(56) References Cited

U.S. PATENT DOCUMENTS

| | | | |
|---|---|---|---|
| 6,293,618 B1 * | 9/2001 | Sukegawa et al. | 296/209 |
| 7,815,247 B2 * | 10/2010 | Obayashi | 296/193.06 |
| 2008/0211264 A1 | 9/2008 | Riess et al. | |
| 2011/0025100 A1 * | 2/2011 | Cimatti | 296/204 |
| 2011/0233970 A1 * | 9/2011 | Nagai et al. | 296/203.03 |

FOREIGN PATENT DOCUMENTS

| | | |
|---|---|---|
| DE | 102009022486 A1 | 12/2010 |
| EP | 0461346 A1 | 12/1991 |
| EP | 2143808 A1 | 1/2010 |
| JP | H06-503778 A | 4/1994 |
| JP | 2000-095146 A | 4/2000 |
| JP | 2001-321842 A | 11/2001 |
| JP | 2002-045923 A | 2/2002 |
| JP | 2002-104239 A | 4/2002 |
| JP | 2002-274426 A | 9/2002 |
| JP | 2011-088494 A | 5/2011 |
| JP | 2011-136621 A | 7/2011 |

OTHER PUBLICATIONS

Search Report and Office Action dated Mar. 30, 2015 issued in the corresponding European Patent Application EP12851652.3.

Office Action mailed Jul. 2, 2015 in the corresponding Chinese Patent Application No. 201280045520.3 and English translation.

* cited by examiner

VEHICLE BODY SIDE PORTION STRUCTURE

TECHNICAL FIELD

This invention relates to a vehicle body side portion structure of a vehicle including a center pillar.

Priority is claimed on Japanese Patent Application No. 2011-257945 filed on Nov. 25, 2011, the contents of which are incorporated herein by reference.

BACKGROUND

In a vehicle having side doors at the fore and the rear, a center pillar connects a roof side rail and a side sill.

As a vehicle body side portion structure of a vehicle of this type, a configuration in which the center pillar itself is formed by a hollow metallic pipe of a substantially constant cross-section is known (for example, refer to Patent Document 1).

This vehicle body side portion structure uses a hollow metallic pipe which is formed into a predetermined shape by three-dimensional bending and to which quenching is applied with respect to at least a curved portion, as the center pillar. The upper and lower end parts of the hollow metallic pipe which is used as the center pillar are fixed to the roof side rail and the side sill by welding or the like.

In this vehicle body side portion structure, it is possible to maintain sufficiently high rigidity of the center pillar by the hollow metallic pipe. Moreover, it is possible to relatively freely bend the hollow metallic pipe along the outer surface shape of the vehicle body or the like by three-dimensional bending. Furthermore, it is possible to sufficiently ensure strength of the curved portion by applying quenching to the curved portion.

RELATED ART DOCUMENTS

Patent Documents

[Patent Document 1] Japanese Unexamined Patent Application, First Publication No. 2011-136621

SUMMARY OF INVENTION

Problems to be Solved by the Invention

However, in the above-described vehicle body side portion structure of the related art, although it is possible to sufficiently ensure the rigidity and strength of the center pillar, ductility of the center pillar decreases so as to be inversely proportional to the strength.

Therefore, in the case of the above-described vehicle body side portion structure of the related art, in consideration of an input of an impact load from the vehicle side portion (side portion at the lower), the energy absorption amount at the center pillar reduces, and also it is necessary to compensate for the increased brittleness by using an additional reinforcement member.

In addition, as a measure of this, partially applying annealing or normalizing to the lower region of the hollow metallic pipe after three-dimensional bending of the hollow metallic pipe at the time of manufacturing the center pillar may be considered; however, in this case, the number of process steps at the time of manufacturing increases, and the manufacturing cost rises.

An object of this invention is to provide a vehicle body side portion structure which can sufficiently ensure the overall strength and rigidity of the center pillar and also can ensure impact absorbability of the lower region of the center pillar by an easily-fabricated and simple configuration.

Means for Solving the Problem

In a vehicle body side portion structure according to an aspect of this invention, the following configurations are employed in order to achieve the aforementioned object.

(1) An aspect according to the present invention is a vehicle body side portion structure in which a roof side rail provided at a side portion of a roof and a side sill provided at a side portion of a floor are connected by a center pillar, wherein the center pillar includes an upper pillar section having an upper end joined to the roof side rail and a lower pillar section having a lower end joined to the side sill, the upper pillar section is formed by a hollow metallic pipe which is constituted by a high-strength steel plate, has a substantially constant cross-sectional shape, and is convexly curved outwardly in a vehicle width direction, the lower pillar section is formed by two pressed components which are constituted by a steel plate having lower strength than the steel plate of the hollow metallic pipe of the upper pillar section and are joined to each other in the vehicle width direction into a closed cross-sectional shape, and a circumference of a lower edge part of the upper pillar section is joined to the two pressed components in a state where the lower edge part of the upper pillar section is inserted within a section configured by the two pressed components of the lower pillar section and having the closed cross-sectional shape.

Thereby, the upper pillar section of the center pillar is formed by a hollow metallic pipe which has a continuously and completely closed cross-section and ensures rigidity easily even when the steel plate constituting the hollow metallic pipe is relatively thin. The lower pillar section is formed by two pressed components having lower strength than the hollow metallic pipe. Because the two pressed components are joined to each other in the vehicle width direction, for example, by enlarging the cross-section of the two pressed components in a vehicle body front-to-rear direction such that the cross-section becomes broader toward the bottom of the two pressed components, it is possible to enhance the rigidity in the vehicle body front-to-rear direction at the lower pillar section, and it is possible to reduce the strength in the vehicle width direction relative to the upper pillar section. In the case that an impact load is input from the side portion of the vehicle, the cross-section of the lower pillar section is collapsed, and thereby the energy of the impact is absorbed.

(2) In the aspect of the above (1), an upper end part of the upper pillar section may be joined to surfaces of the inside and outside in the vehicle width direction of the roof side rail via a joint member which is formed by two pressed components constituted by a steel plate and connected to each other in the vehicle width direction into a closed cross-sectional shape, each of the joint member and the lower pillar section may be provided with a joint flange that joins the pressed components together, the center pillar may further include an outer panel which faces outward of the vehicle, and an upper part of the outer panel may be joined to the joint flange of the joint member, and a lower part of the outer panel may be joined to the joint flange of the lower pillar section.

Thereby, the upper end part of the upper pillar section is joined to the inside surface and the outside surface in the vehicle width direction of the roof side rail via the joint member constituted by two pressed components. In addition, the outer panel of the center pillar is joined to the joint flange of the joint member and the joint flange of the lower pillar section, thus the portions adjacent to the corners of door opening sections are supported by each joint flange.

(3) In the aspect of the above (1) or (2), a groove along an extending direction of the hollow metallic pipe may be continuously formed on at least any one of the outer side and the inner side in the vehicle width direction of the hollow metallic pipe.

(4) In the aspect of any one of the above (1) to (3), the hollow metallic pipe may be a hollow metallic pipe which is formed by forming a linear metallic pipe using roll forming, pultrusion, extrusion, or UO forming, and then bending the linear metallic pipe using hot three-dimensional bending.

(5) In the aspect of any one of the above (1) to (3), the hollow metallic pipe may be a hollow metallic pipe which is formed by forming a linear metallic pipe using roll forming, pultrusion, extrusion, or UO forming, then forming the linear metallic pipe into a curved shape using cold three-dimensional bending, and then performing quenching by heating in an atmosphere furnace followed by rapid cooling.

(6) In the aspect of any one of the above (1) to (3), the hollow metallic pipe may be a hollow metallic pipe which is formed by forming a linear metallic pipe using roll forming, pultrusion, extrusion, or UO forming, then performing heating after performing cold preliminary bending or without performing cold preliminary bending, and immediately after heating, performing quenching while performing profile forming using a metal mold.

(7) In the aspect of any one of the above (1) to (6), an attachment bracket of a door support component may be connected to the hollow metallic pipe.

(8) In the aspect of any one of the above (1) to (7), the pressed component of inside in the vehicle width direction of the lower pillar section may be provided with an opening so as to store a retractor of a seat belt.

(9) In the aspect of any one of the above (1) to (8), the center pillar may include an outer panel which faces outward of the vehicle, and the outer panel may be connected to a surface of the outside in the vehicle width direction of the hollow metallic pipe.

Advantage of the Invention

According to the aspect of the above (1), the upper pillar section is formed by a hollow metallic pipe of high strength while the lower pillar section is formed by two pressed components of lower strength than the hollow metallic pipe into a closed cross-sectional shape, and the lower edge part of the upper pillar section is joined to the two pressed components of the lower pillar section in a state where the lower edge part of the upper pillar section is inserted within the section having the closed cross-sectional shape of the lower pillar section. Thereby, the strength in the vehicle width direction of the lower pillar section can be reduced relative to the upper pillar section, and in the case that an impact load is input from the side portion of the vehicle, the cross-section of the lower pillar section can be collapsed and deformed.

Therefore, according to the aspect of the above (1), while sufficiently ensuring the overall strength and rigidity of the center pillar, it is possible to enhance impact absorption performance of the lower region of the center pillar by an easily-fabricated and simple configuration.

According to the aspect of the above (2), because an upper end part of the upper pillar section is joined to surfaces of the inside and outside in the vehicle width direction of the roof side rail via a joint member constituted by two pressed components, it is possible to join the upper pillar section to the roof side rail by a lightweight and compact joint member without adding a number of reinforcement members.

In addition, according to the aspect of the above (2), because the outer panel of the center pillar is joined to the joint flange of the joint member and the joint flange of the lower pillar section, it is possible to facilitate attachment of the outer panel, and also it is possible to efficiently reinforce the portions adjacent to the corners of door opening sections by the joint flanges.

According to the aspect of the above (3), because a groove along an extending direction of the hollow metallic pipe is continuously formed on at least any one of the outer side and the inner side in the vehicle width direction of the hollow metallic pipe, it is possible to enhance compressive strength of the hollow metallic pipe by the groove. In other words, the groove formed on the outer side in the vehicle width direction of the hollow metallic pipe can suppress deformation of the hollow metallic pipe toward vehicle inside at the time of load input from the lateral side of the vehicle, and the groove formed on the inner side in the vehicle width direction of the hollow metallic pipe can suppress deformation of the hollow metallic pipe toward vehicle outside at the time of a load input from the roof section side.

According to the aspect of the above (4), with respect to the hollow metallic pipe, after a linear metallic pipe is formed by roll forming, pultrusion, extrusion, or UO forming, the linear metallic pipe is formed into a curved shape by hot three-dimensional bending. Therefore, it is possible to perform quenching at the same time as hot three-dimensional bending and to perform manufacturing easily. Moreover, because a metal mold is basically not required at the time of bending forming, it is possible to suppress the cost for a dedicated metal mold. In addition, because quenching is performed simultaneously with hot three-dimensional bending, it is possible to ensure sufficient strength of the upper pillar section.

According to the aspect of the above (5), with respect to the hollow metallic pipe, after a linear metallic pipe is formed by roll forming, pultrusion, extrusion, or UO forming, the linear metallic pipe is formed into a curved shape by cold three-dimensional bending, and then quenching is performed by heating in an atmosphere furnace followed by rapid cooling. Therefore, a metal mold is basically not required at the time of bending forming, and it is possible to suppress the cost for a dedicated metal mold. In addition, by quenching, it is possible to ensure sufficient strength of the upper pillar section.

According to the aspect of the above (6), with respect to the hollow metallic pipe, a linear metallic pipe is formed by roll forming, pultrusion, extrusion, or UO forming, then heating is performed after performing cold preliminary bending or without performing cold preliminary bending, and immediately after heating, quenching is performed simultaneously with profile forming using a metal mold. Therefore, while ensuring sufficient strength of the upper pillar section by quenching, it is possible to give variety to the cross-sectional shape. Accordingly, it is possible to improve design flexibility and to provide a further lightweight structure.

According to the aspect of the above (7), because an attachment bracket of a door support component is connected to the hollow metallic pipe, it is possible to achieve attachment of the door support component by the attachment bracket and improvement of strength and rigidity of the hollow metallic pipe. Therefore, it is possible to thin the center pillar and thereby the weight can be reduced.

According to the aspect of the above (8), because the pressed component of inside in the vehicle width direction of the lower pillar section is provided with an opening so as to store a retractor of a seat belt, it is possible to compactly store the retractor of the seat belt in the lower region of the center pillar According to the aspect of the above (9), because the outer panel of the center pillar is connected to a surface of the outside in the vehicle width direction of the hollow metallic pipe, it is possible to enhance support rigidity of the outer panel of the center pillar and to enhance rigidity of the entire vehicle body side portion.

DESCRIPTION OF THE EMBODIMENTS

Hereinafter, an embodiment of this invention will be described with reference to the drawings.

Figure 1:
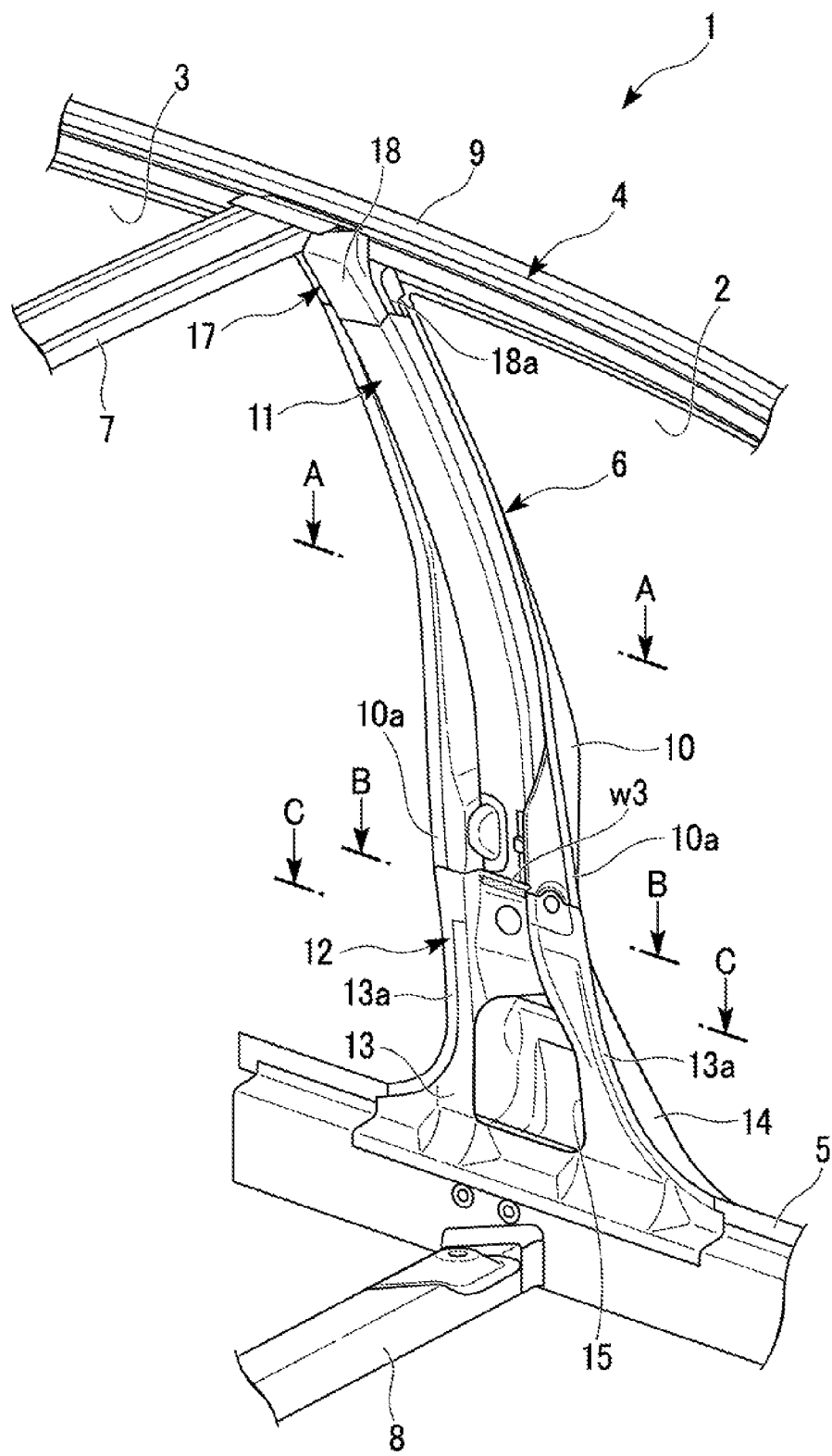
FIG. 1 is a perspective view of a skeleton of a vehicle body side portion of an embodiment according to this invention, looking from the upper inside in a vehicle width direction.

FIG. 1 is a perspective view that shows mainly a skeleton section of a side portion of a vehicle 1 according to this embodiment.

The vehicle 1 of this embodiment is provided with door openings 2 and 3 at the fore and the rear of the vehicle side portion. A side portion of a roof section is provided with a roof side rail 4 which is a skeleton member that extends in the vehicle body front-to-rear direction, and a side portion of a floor section is similarly provided with a side sill 5 which is a skeleton member that extends in the vehicle body front-to-rear direction. The roof side rail 4 and the side sill 5 are connected by a center pillar substantially at the center of the vehicle body in the front-to-rear direction.

Note that, in the drawings, reference symbol 7 denotes a roof rail which connects the right and left roof side rails 4 substantially at the center of the vehicle body in the front-to-rear direction, and reference symbol 8 denotes a floor cross member which connects the right and left side sills 5 substantially at the center of the vehicle body in the front-to-rear direction. In addition, reference symbols 9 and 10 denote an outer panel disposed at the vehicle outside surface of each of the roof side rail 4 and the center pillar 6.

Figure 2:
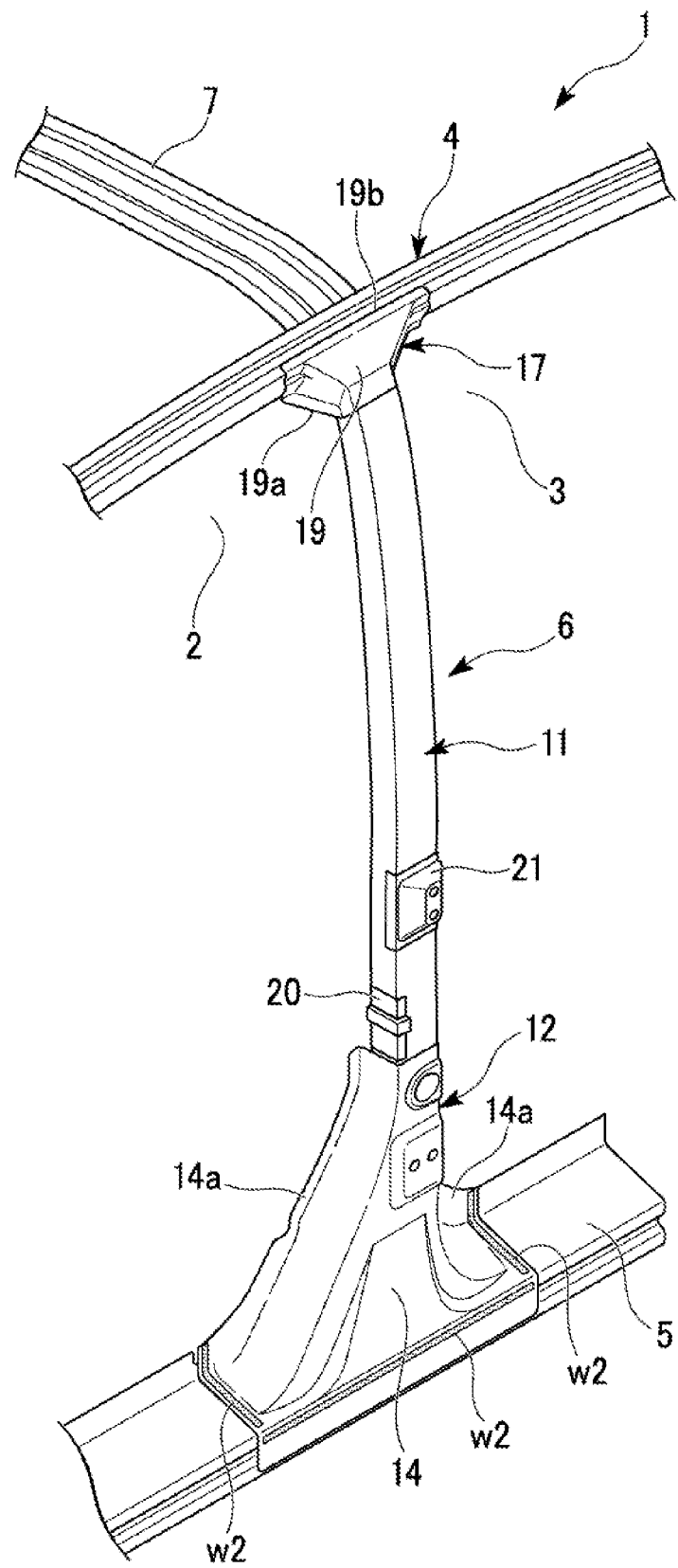
FIG. 2 is a perspective view of the skeleton of the vehicle body side portion, looking from the upper outside in the vehicle width direction.
Figure 3:
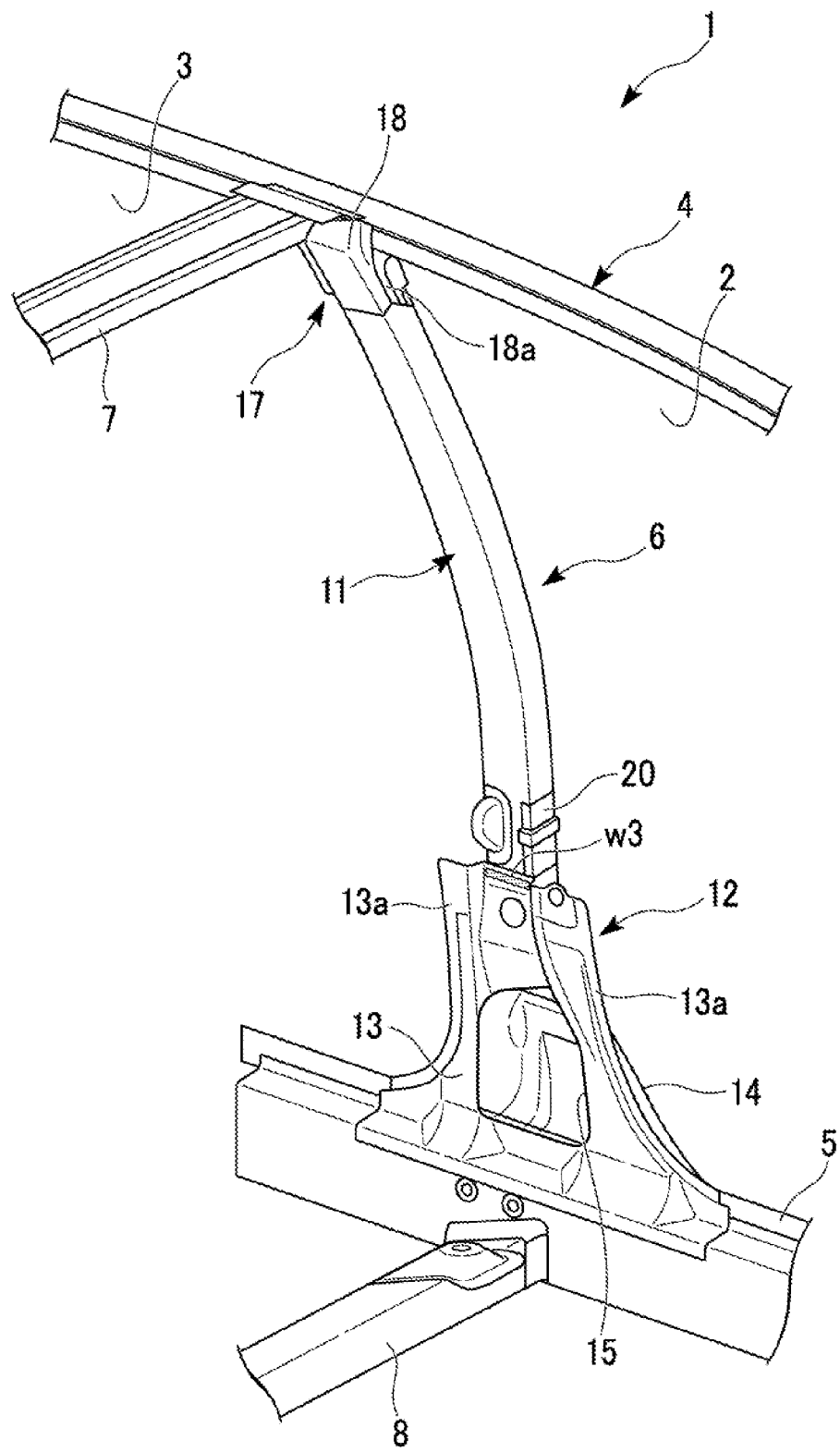
FIG. 3 is a perspective view of the skeleton of the vehicle body side portion, looking from the upper inside in the vehicle width direction.
Figure 4:
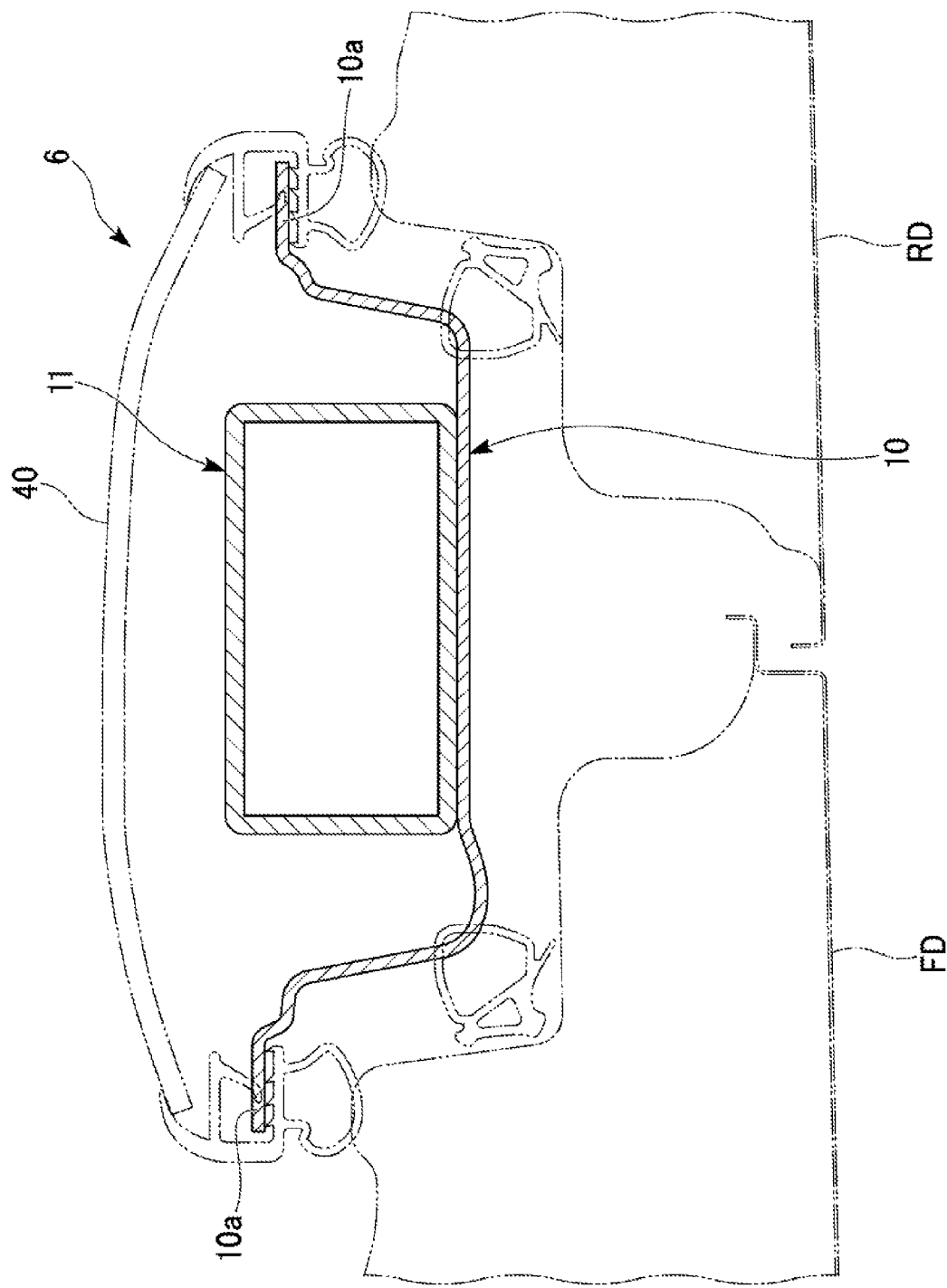
FIG. 4 is a cross-sectional view corresponding to the A-A cross-section of FIG. 1 of the vehicle.

FIG. 2 and FIG. 3 are perspective views which show a skeleton section of the vehicle 1 of which the outer panels 9 and 10 of each of the roof side rail 4 and the center pillar 6 are detached, and FIG. 4 is a cross-sectional view of a portion corresponding to the A-A cross-section of FIG. 1.

The center pillar 6 includes an upper pillar section 11 of which an upper end part is joined to the roof side rail 4, a lower pillar section 12 of which a lower end part is joined to the side sill 5, and the outer panel 10 which covers the vehicle outer side of the upper pillar section 11 and the lower pillar section 12.

The upper pillar section 11 is formed by a hollow metallic pipe which is curved downward from the upper end convexly outwardly in a vehicle width direction. This hollow metallic pipe is constituted by a high-strength steel plate and is formed to have a substantially rectangular and substantially constant cross-section in almost the entire area in the longer direction as is shown in FIG. 4. The forming of this hollow metallic pipe will be described in detail later.

Note that, in FIG. 4, the reference symbols FD and RD represent each side door of the fore portion side and the rear portion side, and reference symbol 40 represents a pillar garnish attached at the vehicle inner side of the center pillar 6.

The lower pillar section 12 is formed into a closed cross-sectional shape by joining two stamped steel plates, including a first panel 13 (pressed component) and a second panel 14 (pressed component) together at respective edge portions thereof to define a hollow receptacle 100 (FIG. 7) having a closed cross-section. These panels 13, 14 are each formed from a steel plate material having a lower strength than the steel material used to make the hollow metallic pipe of the upper pillar section 11. The first panel 13 is disposed toward the inside of the vehicle in the vehicle width direction, and the second panel 14 is disposed toward the outside of the vehicle in the vehicle width direction. The hollow receptacle 100, with a closed cross-section, of the lower pillar section 12 extends in the upward and downward direction of the vehicle body. A lower edge region of upper pillar section 11 is inserted by a predetermined length into an upper region of the hollow receptacle 100 having the closed cross-section. The lower pillar section 11 is fixed by welding to the upper pillar section 11, in a state where the hollow metallic pipe of the upper pillar section 11 is inserted within the hollow receptacle 100 of the lower pillar section 12.

Figure 5:
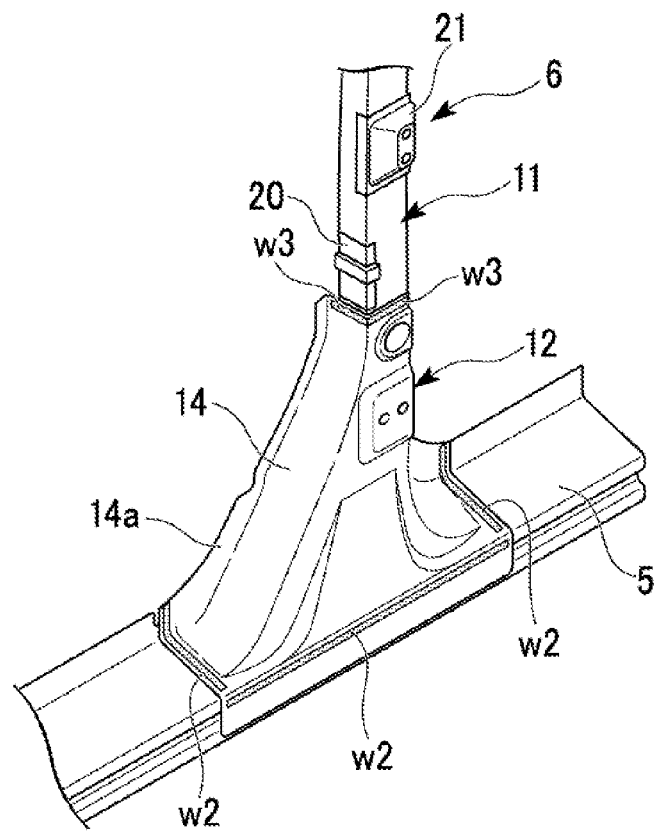
FIG. 5 is a perspective view of the skeleton of the vehicle body side portion, looking from the upper outside in the vehicle width direction.
Figure 6:
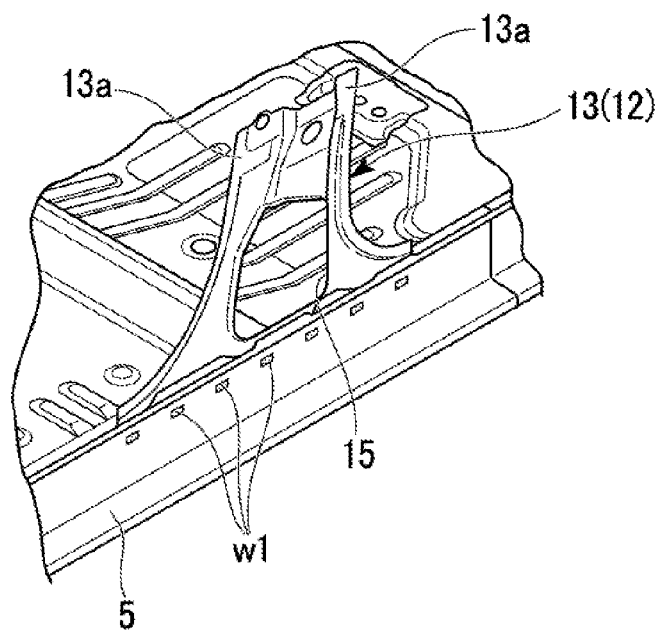
FIG. 6 is a perspective view of the skeleton of the vehicle body side portion, looking from the upper outside in the vehicle width direction.
Figure 7:
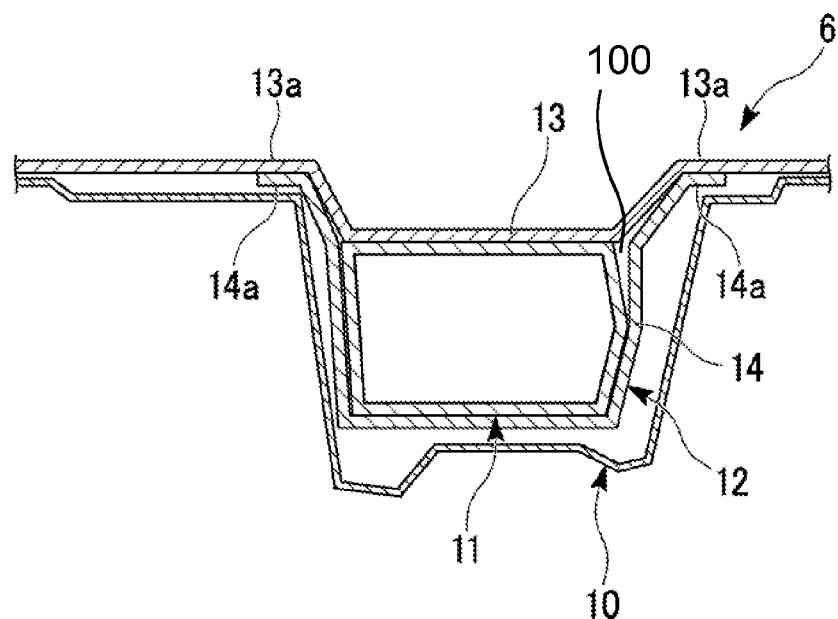
FIG. 7 is a cross-sectional view corresponding to the B-B cross-section of FIG. 1 of the vehicle.
Figure 8:
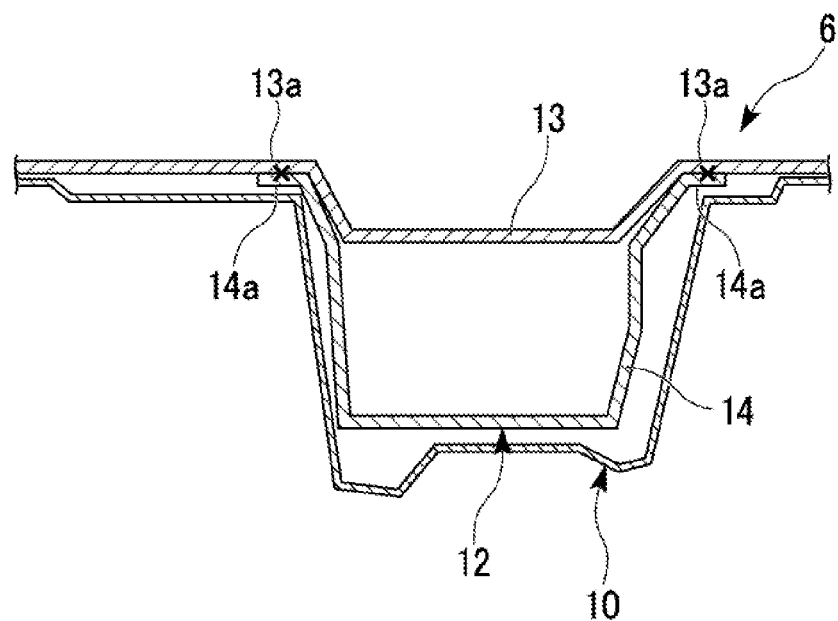
FIG. 8 is a cross-sectional view corresponding to the C-C cross-section of FIG. 1 of the vehicle.

FIG. 5 is a view showing a joint part of the upper pillar section 11 and the lower pillar section 12, and FIG. 6 is a view showing a joint part of the lower pillar section 12 and the side sill 5. FIG. 7 is a view showing a cross-section adjacent to the joint part of the upper pillar section 11, and FIG. 8 is a view showing a cross-section adjacent to the joint part of the lower pillar section 12.

As is also shown in these drawings, both of the first panel 13 and the second panel 14 which constitute the lower pillar section 12 are formed such that the cross-section in the horizontal direction is a hat-like shape, and joint flanges 13a and 14a are formed at both end parts in the front-to-rear direction of the vehicle body. Both of the first panel 13 and the second panel 14 are formed convexly toward the vehicle outer side at the center side with respect to the joint flanges 13a and 14a of both sides, and the second panel 14 is configured such that protrusion height of the center portion from the joint flanges 13a and 14a is higher than that of the first panel 13. Part of the first panel 13 is inserted within the center region of the second panel 14, the joint flange 13a of both sides is disposed over the joint flange 14a of the second panel 14, and in the state, the joint flanges 13a and 14a are welded and fixed together by spot welding or the like.

In addition, the width in the vehicle body front-to-rear direction of the first panel 13 and the second panel 14 is not constant in the upward and downward direction, and gradually increases toward the joint region with the side sill 5 at the lower end from the joint region with the upper pillar section 11 at the upper end. Accordingly, the closed cross-sectional shape into which the first panel 13 and the second panel 14 are joined and formed also becomes broader toward the lower end side from the upper end side.

As is shown in FIG. 6, the lower edge part of the first panel 13 is joined by spot welding or laser welding to the inside surface in the vehicle width direction of the side sill 5 (refer to reference symbol w1 in the drawing), and as is shown in FIG. 5, the lower edge part of the second panel 14 is joined similarly by spot welding or laser welding to the outside surface in the vehicle width direction of the side sill 5 (refer to reference symbol w2 in the drawing).

In addition, as is shown in FIG. 5 and FIG. 3, each upper edge part of the first panel 13 and the second panel 14 is joined by MIG welding or laser welding to the outer circumferential surface of the hollow metallic pipe of the upper pillar section (refer to reference symbol w3 in the drawings).

In addition, as is shown in FIG. 2, FIG. 3, and FIG. 5, a striker attachment bracket 20 used for the door of the fore portion and a hinge attachment bracket 21 used for the door of the rear portion (attachment bracket of the door support component) are fixed by welding to each of a surface of the vehicle foreside of the upper pillar section 11 (hollow metallic pipe) and a surface of the outside in the vehicle width direction of the upper pillar section 11, the surfaces being more upward than the joint part with the first panel 13 and the second panel 14.

Figure 9:
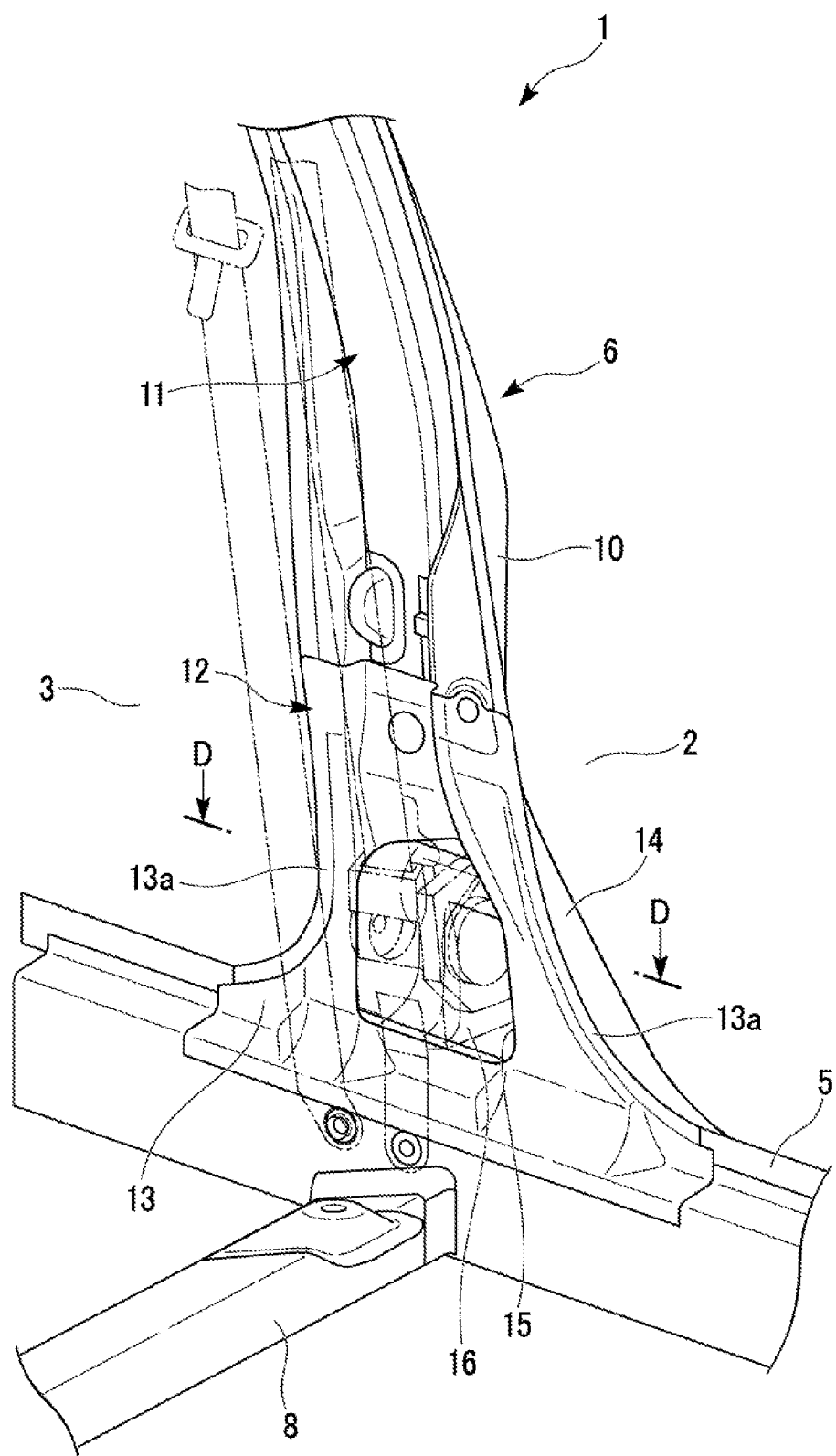
FIG. 9 is a perspective view of the skeleton of the vehicle body side portion, looking from the upper inside in the vehicle width direction.
Figure 10:
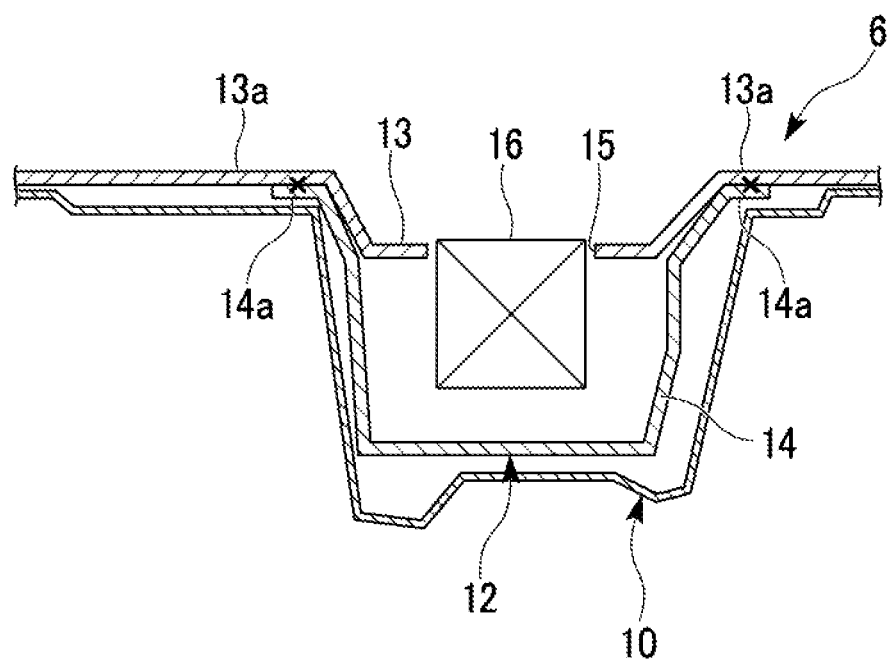
FIG. 10 is a cross-sectional view corresponding to the D-D cross-section of FIG. 9 of the vehicle.

FIG. 9 is a perspective view of the skeleton section of the side portion of the vehicle, looking from inside in the vehicle width direction, and FIG. 10 is a cross-sectional view corresponding to the D-D cross-section of FIG. 9.

As is shown in this figure, the center of the lower region of the first panel 13 is provided with an opening 15 of a relatively large scale and having a substantially pentagonal shape. A retractor 16 of a seat belt is inserted from the vehicle inside into and disposed within the opening 15 of the first panel 13. The retractor 16 is fixed to the vehicle inside of the first panel 13 and the side sill 5 suitably at the upper and the lower positions of the opening 15.

FIGS. 11 to 14 are views showing a joint part of the upper pillar section 11 and the roof side rail 4.

The upper end part of the upper pillar section 11 is joined to the roof side rail 4 via a joint member 17 of another body and having a closed cross-sectional shape. The joint member 17 is configured by a first pressed component 18 (pressed component) made of a steel plate and a second pressed component 19 (pressed component) made of a steel plate. The first pressed component 18 is disposed on the inner side in the vehicle width direction, and the second pressed component 19 is disposed on the outer side in the vehicle width direction.

Both of the first pressed component 18 and the second pressed component 19 are formed such that the cross-section in the horizontal direction has a hat-like shape, and joint flanges 18a and 19a are formed at both end parts in the vehicle body front-to-rear direction. The first pressed component 18 is formed convexly toward the vehicle inner side at the center side with respect to the joint flange 18a of both sides, and the second pressed component 19 is formed convexly toward the vehicle outer side at the center side with respect to the joint flange 19a of both sides.

Figure 11:
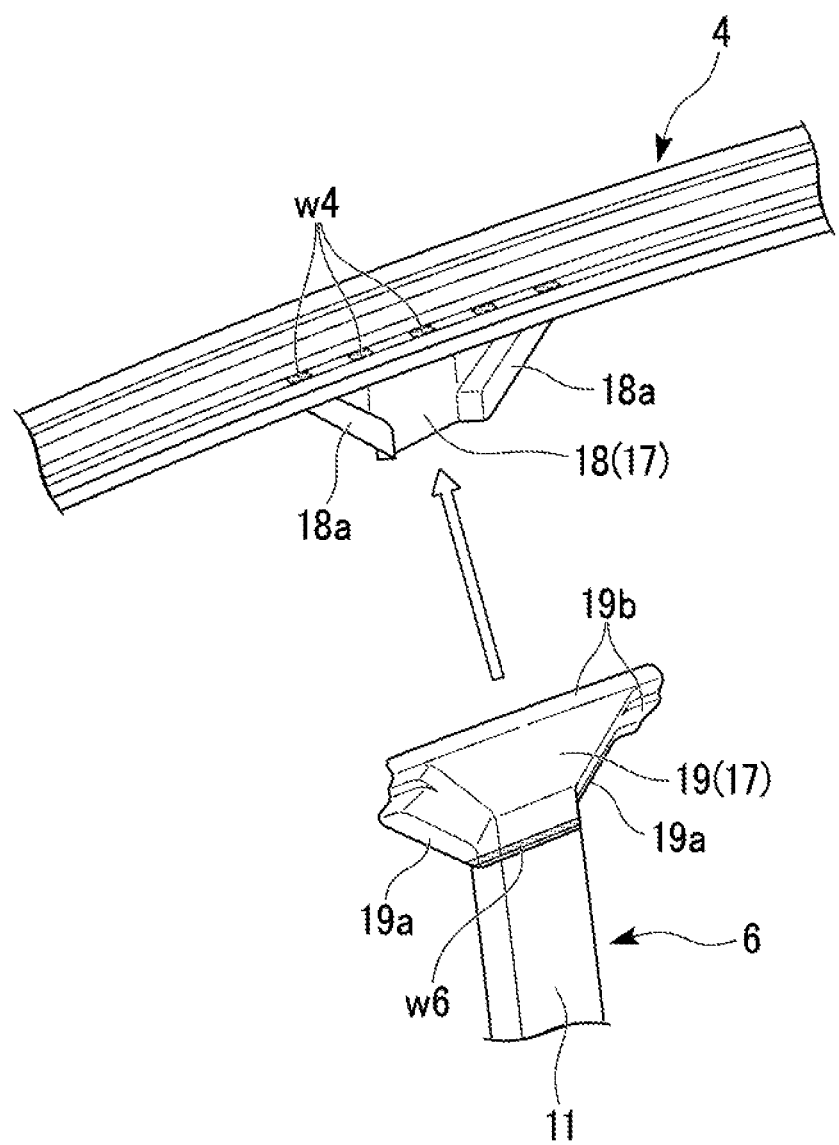
FIG. 11 is an exploded perspective view of the skeleton of the vehicle body side portion, looking from the upper outside in the vehicle width direction.
Figure 12:
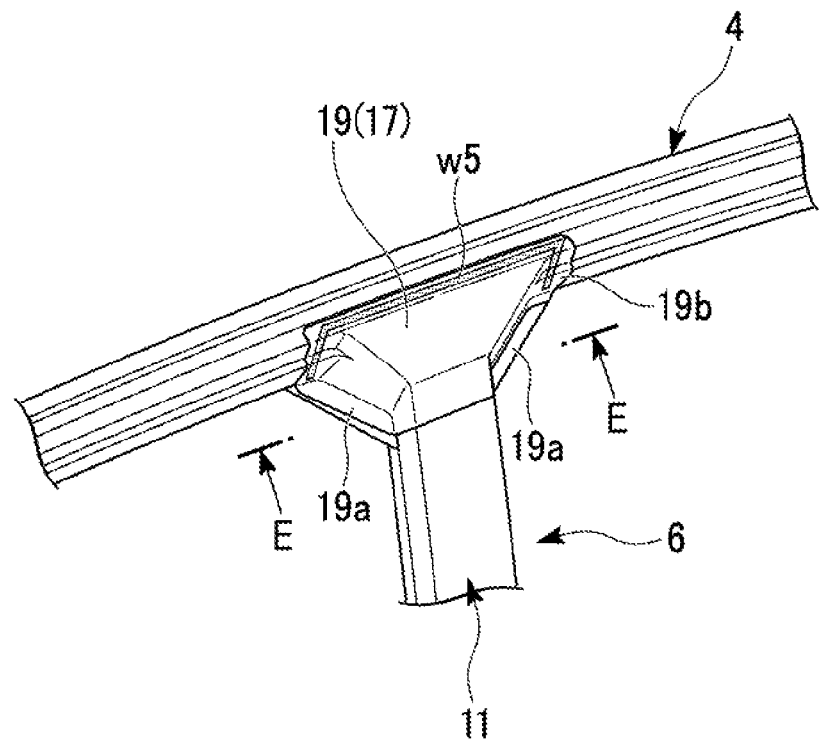
FIG. 12 is a perspective view of the skeleton of the vehicle body side portion, looking from the upper outside in the vehicle width direction.
Figure 13:
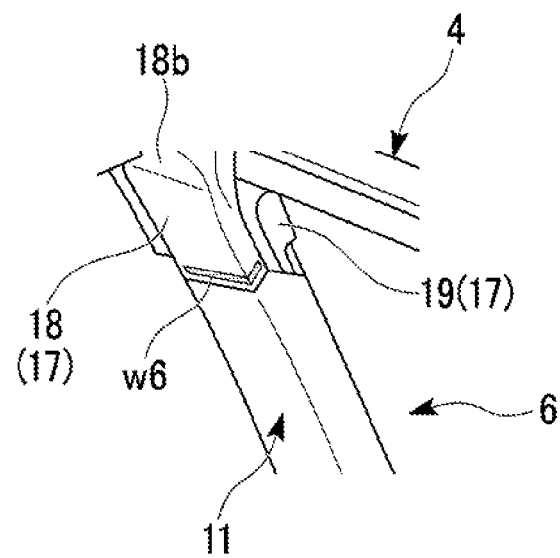
FIG. 13 is a perspective view of the skeleton of the vehicle body side portion, looking from the upper inside in the vehicle width direction.
Figure 14:
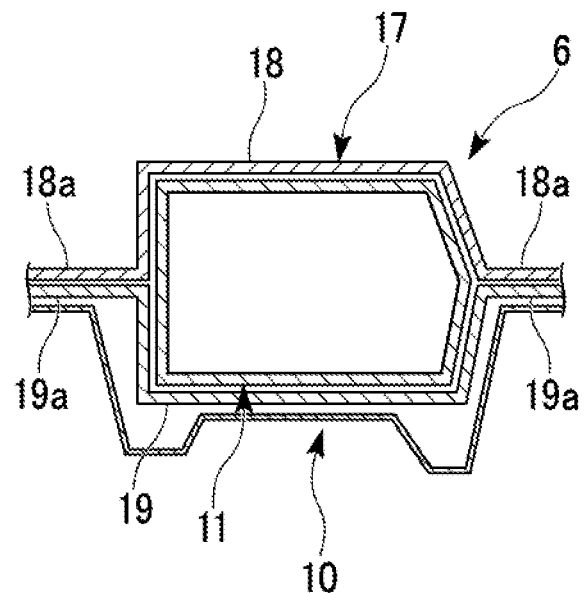
FIG. 14 is a cross-sectional view corresponding to the E-E cross-section of FIG. 12 of the vehicle.

As is shown in FIG. 13, the upper end part of the first pressed component 18 is provided with an upper edge flange 18b, and the upper edge flange 18b is joined to a surface of the inside in the vehicle width direction of the roof side rail 4 from inside in the vehicle width direction by spot welding, laser welding, or the like (refer to reference symbol w4 in FIG. 11). In addition, similarly, as is shown in FIG. 11 and FIG. 12, the upper end part of the second pressed component 19 is provided with an upper edge flange 19b, and the upper edge flange 19b is joined to a surface of the outside in the vehicle width direction of the roof side rail 4 from outside in the vehicle width direction by MIG welding or laser welding (refer to reference symbol w5 in the drawing). Note that, the first pressed component 18 and the second pressed component 19 are joined to each other at the parts of the joint flanges 18a and 19a by spot welding, laser welding, or the like.

In addition, the upper end part of the hollow metallic pipe of the upper pillar section 11 is inserted into the lower end of the section having the closed cross-section formed by the first pressed component 18 and the second pressed component 19, and as is shown in FIG. 11 and FIG. 13, each lower edge of the first pressed component 18 and the second pressed component 19 is joined to the upper pillar section 11 by MIG welding or laser welding (refer to reference symbol w6 in the drawings).

Figure 15:
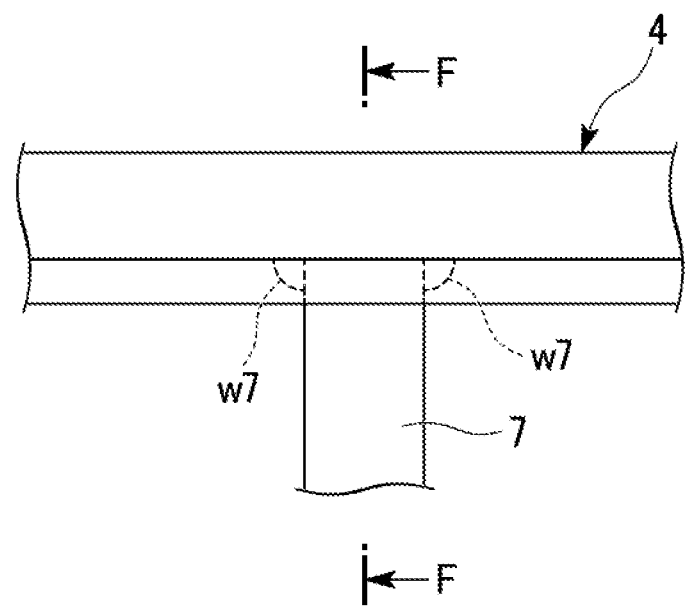
FIG. 15 is a top view of the skeleton of the vehicle body side portion.
Figure 16:
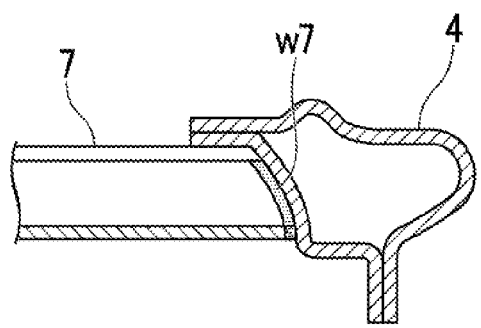
FIG. 16 is a cross-sectional view corresponding to the F-F cross-section of FIG. 15 of the vehicle.

FIG. 15 and FIG. 16 are a view showing a joint part of the roof rail 7 and the roof side rail 4.

As is shown in these drawings, the roof rail 7 is butted against a surface of the inside in the vehicle width direction of the roof side rail 4, and in the state, the circumferential region of the butted part is joined by MIG welding or laser welding (refer to reference symbol w7 in the drawings.

By the way, in the outer panel 10 of the part of the center pillar 6 shown in FIG. 1 and FIG. 4, a joint flange 10a is formed at both end parts in the vehicle body front-to-rear direction, and the center part in the vehicle body front-to-rear direction is formed so as to be more convex toward the vehicle outside than the joint flange 10a. The outer panel 10 is a member configured to cover the vehicle outer side of a region from the joint member 17 at the upper end of the upper pillar section 11 to the lower end of the lower pillar section 12, and the lower region is enlarged toward the joint part with the side sill 5 such that the width in the vehicle body front-to-rear direction becomes broader toward the end of the outer panel 10.

In the upper region of this outer panel 10, the joint flange 10a of both sides is disposed over the front surface of the joint flanges 19a and 18a of both sides of the joint member 17 and is joined to the joint flanges 19a and 18a of the joint member 17 by spot welding or the like. In addition, in the lower region of the outer panel 10, the joint flange 10a of both sides is disposed over the joint flanges 14a and 13a of both sides of the lower pillar section 12 and is joined to the joint flanges 14a and 13a of the lower pillar section 12 by spot welding or the like. The upper and lower end edge parts of the outer panel 10 having the broadening shape toward the end form upper and lower corner parts of the door openings 2 and 3 of the vehicle body, and these parts are supported with high rigidity by the joint flanges 19a and 18a of the joint member 17 and the joint flanges 14a and 13a of the lower pillar section 12.

In addition, the rear surface side of the intermediate region in the upward and downward direction of the outer panel 10 is disposed over the vehicle outside surface of the hollow metallic pipe of the upper pillar section 11 and is joined to the upper pillar section 11 by laser welding or adhesion (adhesive agent). Note that, in this embodiment, as is shown in FIG. 4, a flange section 10a of the intermediate region of the outer panel 10 is joined to none of the skeleton members.

Here, three examples of the manufacturing method of the upper pillar section 11 are described.

<Manufacturing Method 1>

(1) Form a linear hollow metallic pipe by any of roll forming, pultrusion, extrusion, or UO forming.

(2) With respect to the hollow metallic pipe, perform bending forming into a predetermined shape and perform quenching simultaneously by hot three-dimensional bending.

<Manufacturing Method 2>

(1) Form a linear hollow metallic pipe by any of roll forming, pultrusion, extrusion, or UO forming.

(2) With respect to the hollow metallic pipe, perform cold three-dimensional bending using a multipurpose bending machine.

(3) With respect to the hollow metallic pipe, after heating in an atmosphere furnace, perform rapid cooling (quenching). Alternatively, after performing radio-frequency heating, perform rapid cooling.

<Manufacturing Method 3>

(1) Form a linear hollow metallic pipe by any of roll forming, pultrusion, extrusion, or UO forming.

(2) With respect to the hollow metallic pipe, perform preliminary bending into a substantially predetermined shape using a multipurpose bending machine, by pressing, by rotary draw bending, or the like (this step may be omitted).

(3) After heating the hollow metallic pipe by electrical heating or using a heating furnace, form the hollow metallic pipe into a predetermined shape by press forming and simultaneously perform rapid cooling (quenching).

By manufacturing the upper pillar section 11 using any of the above-described manufacturing methods, it is possible to easily obtain a structure having sufficient strength. In addition, in the case of Manufacturing method 3, while ensuring sufficient strength of the upper pillar section 11 by quenching, it is possible to give variety to the cross-sectional shape. Therefore, design flexibility can be enhanced, and it becomes possible to achieve a further lightweight structure.

Figure 17:
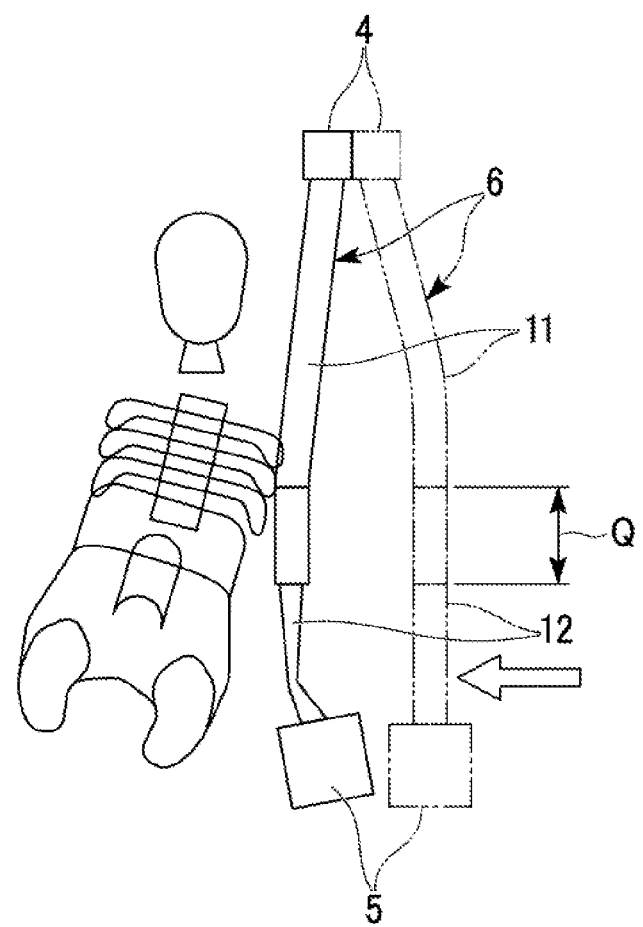
FIG. 17 is a schematic cross-sectional view that shows the behavior of the skeleton of the vehicle body side portion at the time of an impact input.

In the vehicle body side portion structure of this embodiment, as described above, the center pillar 6 includes the upper pillar section 11 configured by a hollow metallic pipe of high strength and the lower pillar section 12 formed by the first panel 13 and the second panel 14 having lower strength than the hollow metallic pipe into a closed cross-sectional shape, and the lower edge part of the hollow metallic pipe of the upper pillar section 11 is joined to the first panel 13 and the second panel 14 in a state where the lower edge part of the hollow metallic pipe of the upper pillar section 11 is inserted within the section having the closed cross-sectional shape of the lower pillar section 12. Thereby, the strength in the vehicle width direction of the lower pillar section 12 is reduced relative to the upper pillar section 11. Therefore, in the case that an impact load is input from the lower region of the side portion of the vehicle, as is shown in FIG. 17, the lower pillar section 12 can be collapsed and deformed in the vehicle width direction.

Then, in this vehicle body side portion structure, when the lower pillar section 12 is collapsed and deformed in the vehicle width direction 12 as described above at the time of input of an impact load from the vehicle side portion, impact energy can be absorbed by the collapse deformation of the lower pillar section 12, and also it is possible to obviate brittle fracture at the root part of the center pillar 6 (connection part with the side sill 5 or the roof side rail 4). As a result, it is possible to further suppress the entry amount of the skeleton member of the vehicle body side portion such as the center pillar 6 toward the vehicle inside.

In addition, in this vehicle body side portion structure, because the upper end part of the upper pillar section 11 is joined to the roof side rail 4 from the inside and outside in the vehicle width direction via the joint member 17 constituted by the first pressed component 18 and the second pressed component 19, it is possible to join the upper pillar section 11 tightly to the roof side rail 4 by the lightweight and compact joint member 17 without adding a number of reinforcement members.

Moreover, in this vehicle body side portion structure, because the outer panel 10 at the area of the center pillar 6 is joined to the joint flanges 18a and 19a of the joint member 17 of upside and the joint flanges 13a and 14a of the lower pillar section 12, it is possible to easily fix the outer panel 10 to the main body side of the center pillar 6, and furthermore, it is possible to support the portions adjacent to the upper and lower corners of the door openings 2 and 3 by the joint flanges 18a, 19a, 13a, and 14a with high rigidity.

In addition, in this vehicle body side portion structure, because the outer panel 10 at the area of the center pillar 6 is joined by welding or adhesion to the surface of the outside in the vehicle width direction of the hollow metallic pipe of the upper pillar section 11, it is possible to further reliably enhance support rigidity of the outer panel 10.

In addition, because the vehicle body structure of this embodiment is configured such that the opening 15 is provided in the first panel 13 which is disposed at the vehicle inner side of the lower pillar section 12 and that the retractor 16 of the seat belt apparatus is stored within the opening 15, it is possible to compactly dispose the retractor 16 in the lower region of the center pillar 6 while employing a structure in which the hollow metallic pipe is used.

Moreover, in this embodiment, the striker attachment bracket 20 is joined to the vehicle body foreside surface of the hollow metallic pipe of the upper pillar section 11, and the hinge attachment bracket 21 is joined to the vehicle outside surface of the hollow metallic pipe of the upper pillar section 11. Therefore, it is possible to attach the door support component to the center pillar 6 of high rigidity, and also it is possible to efficiently enhance the strength of the upper pillar section 11 by the brackets 20 and 21, specifically, the strength in the vicinity of the center in the upward and downward direction of the center pillar 6 where high strength is required.

Figure 18:
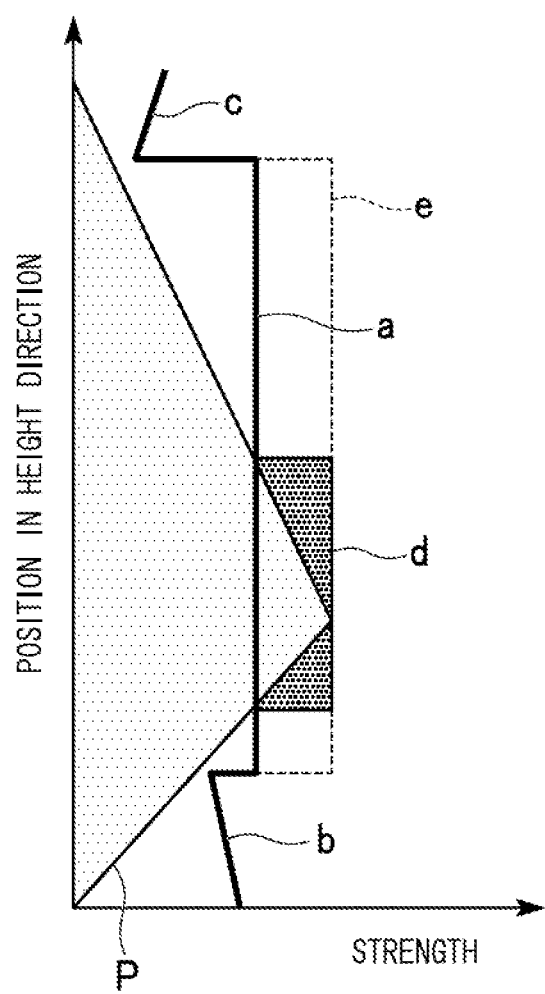
FIG. 18 is a diagrammatic view that shows required strength for each height of the center pillar and strength of the actual structure.

FIG. 18 is a diagrammatic view showing the required strength for each height of the center pillar and the strength of the actual structure.

In this figure, P represents the required strength for each height in consideration of the input of an impact load from the vehicle lateral side, a represents the strength by the hollow metallic pipe of the upper pillar section 11, b represents the strength by the lower pillar section 12, c represents the strength by the joint member 17, and d represents the strength which is obtained by adding the striker attachment bracket 20 and the hinge attachment bracket 21. In addition, in this figure, e represents the strength when the thickness of the hollow metallic pipe is increased so as to satisfy the required strength P at all heights.

As is shown in this figure, in the vehicle body side portion structure of this embodiment, because the striker attachment bracket 20 and the hinge attachment bracket 21 are joined to the hollow metallic pipe of the upper pillar section 11, it is possible to satisfy the required strength P at all heights while sufficiently keeping the thickness of the hollow metallic pipe thin. Therefore, according to this structure, it is possible to reduce the weight of the vehicle.

Note that, as is shown in FIG. 17, it is preferable to set the position of the lower end of an overlap part Q in the upper and lower direction between the upper pillar section 11 (hollow metallic pipe) of the center pillar 6 and the lower pillar section 12 of the center pillar 6 to a position, for example, below the armpit portion of the occupant and above the waist portion of the occupant. By such a setting, the lower pillar section 12 is deformed at the waist height of the occupant at the time of input of an impact load from lateral side, and it is possible to suppress the displacement of the occupant to a reduced amount.

Figure 19:
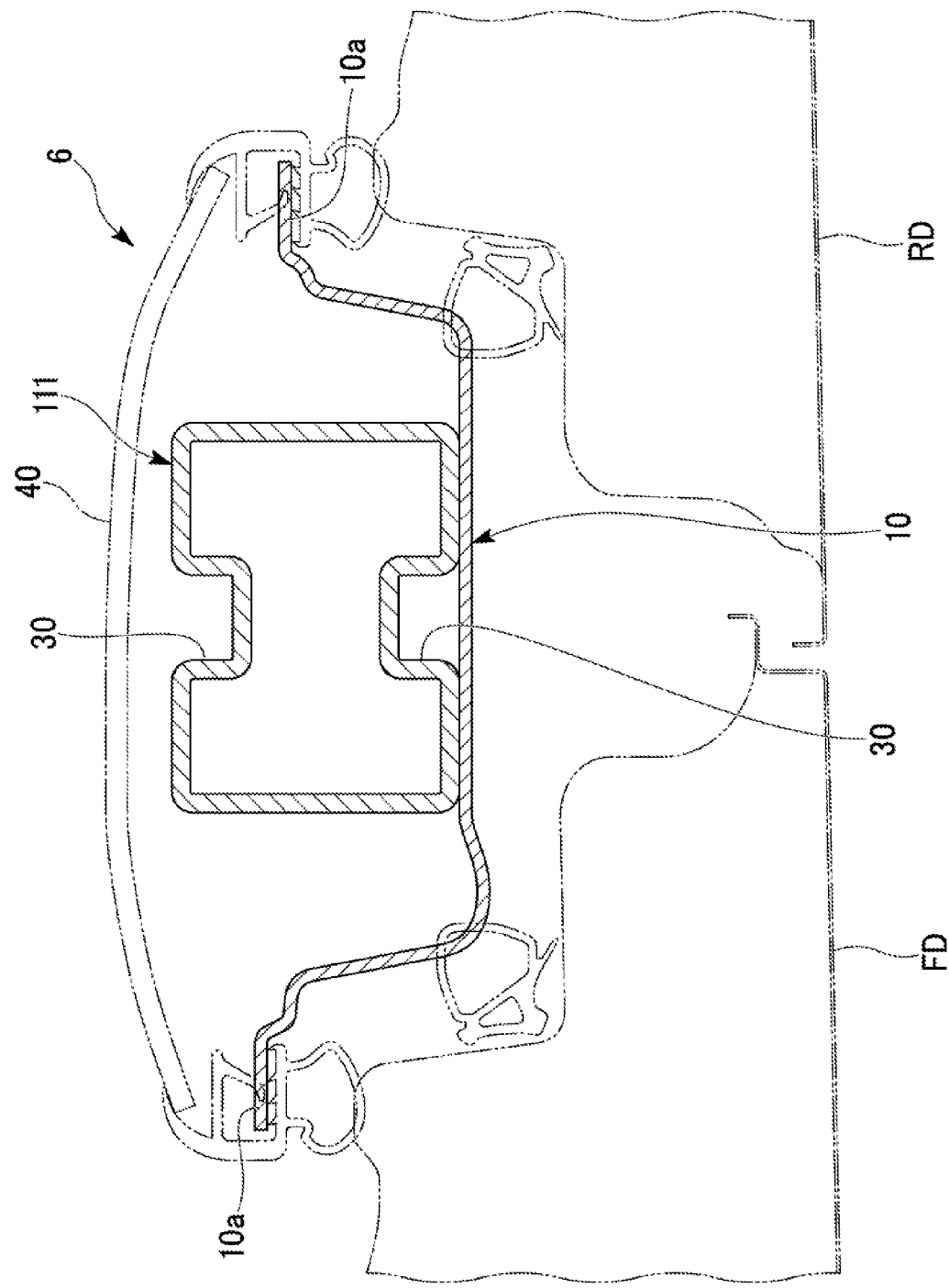
FIG. 19 is a cross-sectional view corresponding to the A-A cross-section of FIG. 1 of another embodiment according to this invention.

In addition, FIG. 19 is a cross-sectional view corresponding to the A-A cross-section of FIG. 1 of another embodiment. Note that, in this figure, the same part as the above-described embodiment is denoted by the same reference symbol.

In the vehicle body side portion structure of this other embodiment, the cross-sectional shape of the hollow metallic pipe which constitutes an upper pillar section 111 is different from that of the above-described embodiment. In other words, the hollow metallic pipe of the above-described embodiment has a simple rectangular shape; however, in the hollow metallic pipe of the upper pillar section 111 of this other embodiment, a groove 30 along the extending direction of the hollow metallic pipe is continuously formed on both surfaces of the outside and inside in the vehicle width direction.

In the vehicle body side portion structure of this other embodiment, because the contiguous groove 30 is formed on both surfaces of the inside and outside of the hollow metallic pipe of the upper pillar section 111, it is possible to efficiently enhance the strength in the compressive direction of the hollow metallic pipe by these grooves 30. In other words, the groove 30 formed on the outer side in the vehicle width direction works effectively so as to prevent the deformation of the hollow metallic pipe toward the inside in the vehicle width direction at the time of input of an impact load from the lateral side of the vehicle. The groove 30 formed on the inner side in the vehicle width direction works effectively so as to prevent the deformation of the hollow metallic pipe toward the outside in the vehicle width direction at the time of input of an impact load from the roof side such as the time of a rollover of the vehicle.

Note that, the technical scope of the present invention is not limited to the above-described embodiments and a variety of design modifications can be made without departing from the scope of the present invention.

DESCRIPTION OF THE REFERENCE SYMBOLS

4: ROOF SIDE RAIL
5: SIDE SILL
6: CENTER PILLAR
10: OUTER PANEL
11, 111: UPPER PILLAR SECTION
12: LOWER PILLAR SECTION
13: FIRST PANEL (PRESSED COMPONENT)
13*a*: JOINT FLANGE
14: SECOND PANEL (PRESSED COMPONENT)
14*a*: JOINT FLANGE
15: OPENING
16: RETRACTOR
17: JOINT MEMBER
18: FIRST PRESSED COMPONENT (PRESSED COMPONENT)
18*a*: JOINT FLANGE
19: SECOND PRESSED COMPONENT (PRESSED COMPONENT)
19*a*: JOINT FLANGE
20: STRIKER ATTACHMENT BRACKET (ATTACHMENT BRACKET OF DOOR SUPPORT COMPONENT)
21: HINGE ATTACHMENT BRACKET (ATTACHMENT BRACKET OF DOOR SUPPORT COMPONENT)
30: GROOVE

The invention claimed is:

1. A vehicle body side portion structure in which a roof side rail provided at a side portion of a roof and a side sill provided at a side portion of a floor are connected by a center pillar, wherein:
    the center pillar includes an upper pillar section having an upper end joined to the roof side rail and a lower pillar section having a lower end joined to the side sill;
    the upper pillar section is formed as a hollow metallic pipe which comprises a high-strength steel plate, has a substantially constant cross-sectional shape, and is convexly curved outwardly in a vehicle width direction;
    the lower pillar section is formed by two pressed components which are respectively formed from steel plate having a lower strength than the steel plate of the upper pillar section, and which are joined to each other in the vehicle width direction to define a hollow receptacle having a closed cross-sectional shape; and
    a lower edge part of the upper pillar section is inserted within the hollow receptacle of the lower pillar section.

2. The vehicle body side portion structure according to claim 1, wherein:
    an upper end part of the upper pillar section is joined to surfaces of the inside and outside of the roof side rail in the vehicle width direction via a joint member which is formed by two pressed components formed from steel plate and connected to each other in the vehicle width direction into a closed cross-sectional shape;
    each of the joint member and the lower pillar section is respectively provided with a joint flange that joins the pressed components together;
    the center pillar further includes an outer panel which faces outward of the vehicle; and
    an upper part of the outer panel is joined to the joint flange of the joint member, and a lower part of the outer panel is joined to the joint flange of the lower pillar section.

3. The vehicle body side portion structure according to claim 1, wherein a groove is formed in the hollow metallic pipe along an extending direction thereof on at least one of the outer side and the inner side of the hollow metallic pipe in the vehicle width direction.

4. The vehicle body side portion structure according to claim 1, wherein the hollow metallic pipe is formed by forming a linear metallic pipe using a process of roll forming, pultrusion, extrusion, or UO forming, and then bending the linear metallic pipe using hot three-dimensional bending.

5. The vehicle body side portion structure according to claim 1, wherein the hollow metallic pipe is formed by forming a linear metallic pipe using a process of roll forming, pultrusion, extrusion, or UO forming, then forming the linear metallic pipe into a curved shape using cold three-dimensional bending, and then performing quenching by heating in an atmosphere furnace followed by rapid cooling.

6. The vehicle body side portion structure according to claim 1, wherein the hollow metallic pipe is formed by forming a linear metallic pipe using a process of roll forming, pultrusion, extrusion, or UO forming, then performing heating after performing cold preliminary bending or without performing cold preliminary bending, and immediately after heating, performing quenching while performing profile forming using a metal mold.

7. The vehicle body side portion structure according to claim 1, further comprising an attachment bracket of a door support component, wherein the bracket is connected to the hollow metallic pipe.

8. The vehicle body side portion structure according to claim 1, wherein one of the pressed components of the lower pillar section which is situated facing inside in the vehicle width direction is provided with an opening formed therein and configured to receive and store a retractor of a seat belt.

9. The vehicle body side portion structure according to claim 1, wherein:
the center pillar includes an outer panel which faces outward of the vehicle; and
the outer panel is connected to a surface of the hollow metallic pipe which faces outside in the vehicle width direction.

10. The vehicle body side portion structure according to claim 2, wherein a groove is formed in the hollow metallic pipe along an extending direction thereof on at least one of the outer side and the inner side of the hollow metallic pipe in the vehicle width direction.

11. The vehicle body side portion structure according to claim 2, wherein the hollow metallic pipe is formed by forming a linear metallic pipe using a process of roll forming, pultrusion, extrusion, or UO forming, and then bending the linear metallic pipe using hot three-dimensional bending.

12. The vehicle body side portion structure according to claim 2, wherein the hollow metallic pipe is formed by forming a linear metallic pipe using a process of roll forming, pultrusion, extrusion, or UO forming, then forming the linear metallic pipe into a curved shape using cold three-dimensional bending, and then performing quenching by heating in an atmosphere furnace followed by rapid cooling.

13. The vehicle body side portion structure according to claim 2, wherein the hollow metallic pipe is formed by forming a linear metallic pipe using a process of roll forming, pultrusion, extrusion, or UO forming, then performing heating after performing cold preliminary bending or without performing cold preliminary bending, and immediately after heating, performing quenching while performing profile forming using a metal mold.

14. The vehicle body side portion structure according to claim 2, further comprising an attachment bracket of a door support component, wherein the bracket is connected to the hollow metallic pipe.

15. The vehicle body side portion structure according to claim 2, wherein one of the pressed components of the lower pillar section which is situated facing inside in the vehicle width direction is provided with an opening formed therein and configured to receive and store a retractor of a seat belt.

16. The vehicle body side portion structure according to claim 2, wherein:
the center pillar includes an outer panel which faces outward of the vehicle; and
the outer panel is connected to a surface of the hollow metallic pipe which faces outside in the vehicle width direction.

17. A vehicle body side portion structure in which a roof side rail provided at a side portion of a roof, and a side sill provided at a side portion of a floor are connected by a center pillar, wherein:
the center pillar includes an upper pillar section having an upper end joined to the roof side rail and a lower pillar section having a lower end joined to the side sill;
the upper pillar section is formed as a hollow metallic pipe formed from a high-strength steel plate, has a substantially constant closed cross-sectional shape, and is bent so as to be convexly curved outwardly in a vehicle width direction;
the lower pillar section is formed by two joined components which are steel plates having a lower strength than the steel plate of the hollow metallic pipe of the upper pillar section, and are joined to each other in the vehicle width direction so as to form a hollow receptacle having a closed cross-sectional shape; and
a lower edge part of the upper pillar section is inserted inside of the hollow receptacle of the lower pillar section, and in at least part of the hollow receptacle, the lower pillar section completely surrounds and encloses the lower edge part of the upper pillar section.

18. The vehicle body side portion structure according to claim 17, wherein:
an upper end part of the upper pillar section is joined to surfaces of the inside and outside in the vehicle width direction of the roof side rail via a joint member which is formed by two pressed components formed from steel plate and connected to each other in the vehicle width direction to form a closed cross-sectional shape;
each of the joint member and the lower pillar section is provided with a joint flange that joins the pressed components together;
the center pillar further includes an outer panel which faces outward of the vehicle; and
an upper part of the outer panel is joined to the joint flange of the joint member, and a lower part of the outer panel is joined to the joint flange of the lower pillar section.

19. The vehicle body side portion structure according to claim 17, wherein a groove is formed in the hollow metallic pipe along an extending direction thereof on at least one of the outer side and the inner side of the hollow metallic pipe in the vehicle width direction.

* * * * *